United States Patent [19]

Hsu

[11] Patent Number: 5,769,719
[45] Date of Patent: Jun. 23, 1998

[54] VIDEO GAME SYSTEM HAVING MEANS FOR DISPLAYING A KEY PROGRAMMING

[75] Inventor: Jerry Hsu, Hsin-Chu, Taiwan

[73] Assignee: United Microelectronics Corp., Hsin-Chu, Taiwan

[21] Appl. No.: 451,429

[22] Filed: May 26, 1995

[51] Int. Cl.⁶ .................................. G06F 3/02; A63F 9/24
[52] U.S. Cl. ........................ 463/37; 345/156; 273/148 B
[58] Field of Search .................................. 463/1, 36, 39, 463/38, 7, 8, 30–31; 273/148 B, 37; 358/335; 348/734, 569; 359/142, 146; 345/156, 157; 455/130, 151.1, 151.2, 151.4

[56] References Cited

U.S. PATENT DOCUMENTS

| | | | |
|---|---|---|---|
| 4,856,081 | 8/1989 | Smith | 348/734 |
| 4,924,216 | 5/1990 | Leung | 463/38 |
| 5,031,046 | 7/1991 | Brüggemann | 348/734 |
| 5,259,626 | 11/1993 | Ho | 273/148 B |
| 5,317,505 | 5/1994 | Karabed et al. | 273/148 B |
| 5,382,983 | 1/1995 | Kwoh et al. | 348/569 |
| 5,451,053 | 9/1995 | Garrido | 463/38 |
| 5,515,173 | 5/1996 | Mankovitz et al. | 358/335 |
| 5,546,193 | 8/1996 | Hailey et al. | 358/335 |

*Primary Examiner*—Jessica Harrison
*Assistant Examiner*—Mark A. Sager
*Attorney, Agent, or Firm*—Bacon & Thomas

[57] ABSTRACT

This invention relates to a video game system having a displaying software for displaying a key programming process. The video game system comprises a video display, a game cartridge, a game control unit having a program key and a plurality of control keys, and a game box. The game box comprises a game cartridge slot, a memory unit, a central processing unit, and a storage unit having a system software comprises a displaying software for displaying the key programming process over the video display so that a LCD screen is not needed in the game control unit for such displaying purpose. The input signals generated during the key programming process are saved in the memory unit of the game box so that a memory buffer is not needed in the game control unit for such storage purpose so that the game control unit can further be simplified.

14 Claims, 2 Drawing Sheets

VIDEO GAME SYSTEM HAVING MEANS FOR DISPLAYING A KEY PROGRAMMING

BACKGROUND OF THE INVENTION

1. Field of the Invention

This invention relates to a video game system, and more particularly, to a video game system comprising a game box, a game control unit, a video display and means for displaying a key programming process over the video display.

2. Description of the Prior Art

Most of the video game systems available in the market comprise a game box, a game control unit and a video display for playing a video game. The video game is stored in a game cartridge which is plugged in a slot of the game box. The video game system and the game cartridges are sold separately so that video game players can buy various game software to play in a specific video game system.

When playing a video game, the game cartridge which is a read-only-memory (ROM) device for storing the video game software, is plugged to the game box for program execution. The game box is a small computer system which comprises a memory unit and a central processing unit (CPU) for program execution. After the game cartridge is plugged to the game box, the CPU executes the video game software stored in the game cartridge and displays video outputs over the video display.

The game control unit is the key user interface for playing a video game. It usually comprises a plurality of control keys for controlling a movable object of the video game to perform certain functions such as move up, down, right or left, jump, kick, etc. The game box receives input signals generated from the game control unit and uses these input signals to control the proceedings of the video game and displays video outputs over the video display in an interactive manner.

Because the game control unit is not an integral part of the game box, game control units with various control keys or features can usually be selected by a player when purchasing a complete video game system. When playing a video game, the functions of the some control keys are defined by the video game software to perform certain game functions such as move, jump, shoot, kick, etc. Other control keys of the game control unit are either spared by the video game software or used to perform some system control functions such as start, select, etc.

Many of the video game software developed for such video game systems not only define some game functions over certain control keys as mentioned above, but also define some key sequences to perform some special functions to increase the fun of playing. For example, one press of a control key A can fire a generic bullet by a movable object displayed in a video screen while one press of both control keys A and B can fire a super bullet which is more powerful than the generic bullet. Such key sequence can be keyed in either sequentially or simultaneously, depending on the video game software which defines it. Sometime such key sequences are quite lengthy and complex such as "left, left-down, down, down-right, right, A". It is usually not easy to memorize such key sequences and also difficult to correctly press such key sequences in a timely manner while playing a game. Such problems are quickly addressed by adding some advanced features to the game control units to facilitate such operations.

One type of advanced game control units provide a program key and also a memory means to store the key sequences. Upon pressing the program key, the game control unit will switch to a programming mode to initiate a key programming process. The control key to be programmed is then pressed first, and the key sequence is inputted and stored in the memory means. At the end of the key programming process, the program key is pressed again to terminate the process. If the programmed key is pressed later on, the game control unit will generates a plurality of input signals according to the key sequence stored in the memory means.

Two problems usually occur when using such game control units. The first problem is that a player can not see what control keys have been inputted and stored in the memory means during the key programming process. He will have no idea whether the key sequence has been successfully inputted and stored in the memory means until he presses the programmed key later on. The second problem is that the extra cost generated from the memory means and its associated control circuit which makes the game control unit more expensive than a game control unit which has no such memory means.

Another type of advanced game control units provide not only a program key and a memory means, but also a LCD screen for displaying the key sequence during the key programming process. Although the LCD screen solves the first problem mentioned above which allows a player to see what has been inputted and stored in the memory means, the LCD screen and its related control circuit makes this game control unit even more expensive than the one mentioned above.

SUMMARY OF THE INVENTION

It is therefore the goal of the present invention, by overcoming the limits of the prior art, to devise a video game system to achieve the follow objects:

1. To display a key programming process over the video display of the video game system so that a player can see what control keys have been inputted during the key programming process. 2. To save the key sequence inputted from the key programming process in the game box so that the game control unit can be simplified to reduce its cost.

Briefly, in a preferred embodiment, the present invention includes a video game system comprising:

(1) a video display;
(2) a game cartridge having a video game software stored in it;
(3) a game control unit having a program key and a plurality of control keys; and
(4) a game box comprising:
   (a) an electrical cable for connecting the video display;
   (b) a slot for receiving the game cartridge wherein the game cartridge is removably plugged in the slot;
   (c) a memory unit and a central processing unit (CPU) for program execution;
   (d) a system software for controlling the operations of the game box; the system software comprising a displaying means for displaying a key programming process over the video display after the program key is pressed and terminating the display of the key programming process after the program key is pressed again; the key programming process defining the function of a control key by using a plurality of other control keys of the game control unit;

wherein the video game software stored in the game cartridge is executed by the CPU when playing the video game, and the game box receives input signals from the game control unit to control the proceedings of the video game and displays the video outputs over the video display. The signals generated by the key sequence during the key programming process are saved in the memory unit of the game box by the system software and the system software passes the saved signals to the video game software after the programmed control key is pressed.

It is an advantage of the present invention that the video game system displays the key programming process over its video display so that a player can see what control keys have been inputted during the key programming process and there is no need to install a LCD screen over the game control unit for such purpose whereby the game control unit can be greatly simplified.

It is another advantage of the present invention that the key sequence inputted from the key programming process is saved in the memory unit of the game box so that there is no need to install a memory means over the game control unit for such purpose whereby the game control unit can further be simplified.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
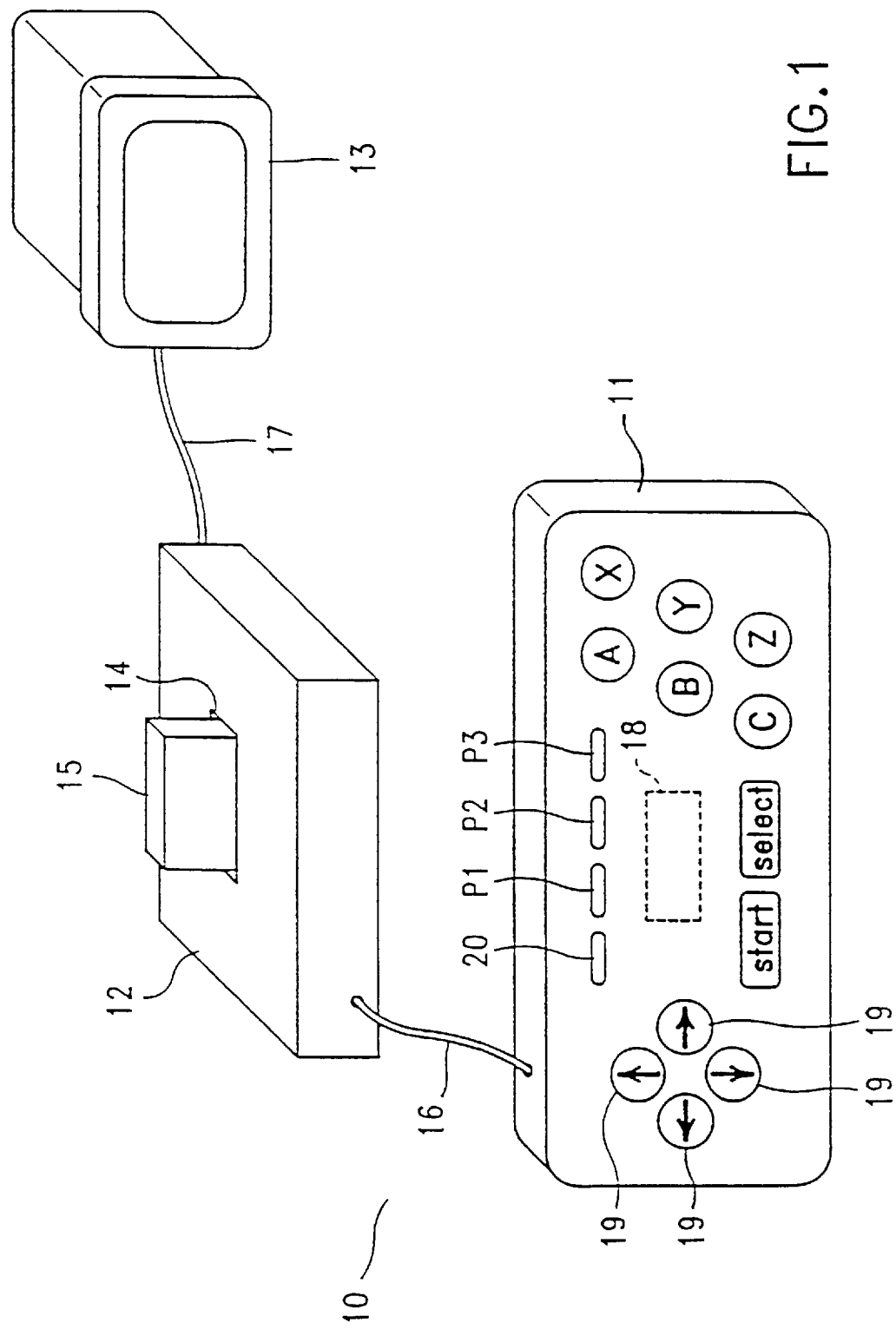
FIG. 1 is a system diagram of a video game system according to the present invention.

Please refer to FIG. 1. FIG. 1 is a system diagram of a video game system 10 according to the present invention. The video game system 10 comprises a game control unit 11, a game box 12 and a video display 13 which can be a TV set or a computer monitor. The video display 13 is connected to the game box 12 by an electrical cable 17. The game box 12 has a game cartridge slot 14 for receiving a game cartridge 15. The game cartridge 15 is a storage device which comprises a read-only-memory (ROM) in it for storing a video game software and is removably plugged in the game cartridge slot 14 for program execution. The game box 12 receives input signals from the game control unit 11 through an electrical cable 16 and displays video outputs over the video display 13. When playing a video game, the video game software stored in the game cartridge 15 is executed. A player can then play the video game in an interactive manner by using the game control unit 11.

The game control unit 11 comprises one program key 20 and fifteen control keys in it. The fifteen control keys include: four direction keys 19, three programmable keys P1, P2 and P3, start and select keys, and six function keys A,B,C,X,Y and Z. The four direction keys 19 are used to control the movement of a movable object of the video game. The six function keys are usually defined by video game software to perform certain functions such as shoot, jump, kick, etc. The program key 20 is used to initiate a key programming process which defines the function of a control key such as P1, P2 or P3 by a key sequence which is formed by a plurality of other control keys such as the function keys or the direction keys. The key programming process will be explained in FIG. 3. The game control unit 11 further comprises an optional memory means 18 for storing key sequences created through the key programming process. The game control unit 11 is electrically connected to the game box 12 through an electrical cable 16. It can also communicates with the game box 12 by using a wireless communication method such as infrared (not shown).

Figure 2:
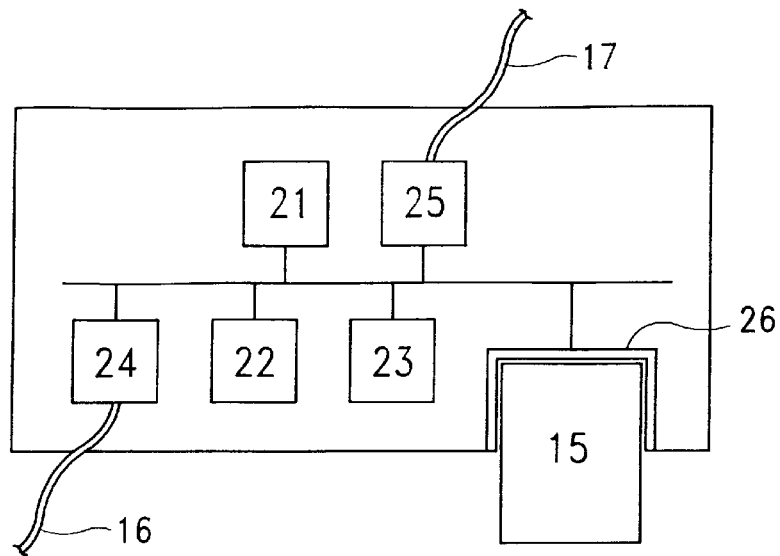
FIG. 2 is a block diagram of the game box shown in FIG. 1.

FIG. 2 is a block diagram of the game box 12 shown in FIG. 1. The game box 12 is a small computer which comprises a memory unit 22 and a central processing unit 21 for program execution, a storage unit 23 which is a read-only-memory (ROM) device for storing a system software, an input controller 24 connected to the game control unit 11 for receiving input signals from the game control unit, a video controller 25 connected to the video display 13 for passing video outputs to the video display, and a slot 26 for connecting the game cartridge 15 for program execution. The memory unit 22 can be used as a temporary data buffer for program execution, and the system software can be stored in the game cartridge 15 instead of in the storage unit 23.

The system software is used for control the operations of the game box 12. The video game software stored in the game cartridge 15 is executed by the CPU 21 when playing the video game, and the input controller 24 receives input signals from the game control unit 11 to control the proceedings of the video game and displays the video outputs generated by the video game software over the video display 13 by using the video controller 25.

The system software comprises a displaying means in it for displaying the key programming process over the video display 13 after the program key 20 is pressed by a player to define the function of a control key by using a plurality of other control keys, and terminating the display of the key programming process after the program key 20 is pressed again. The displaying means is a software which handles all the displaying functions for the key programming process.

Figure 3:
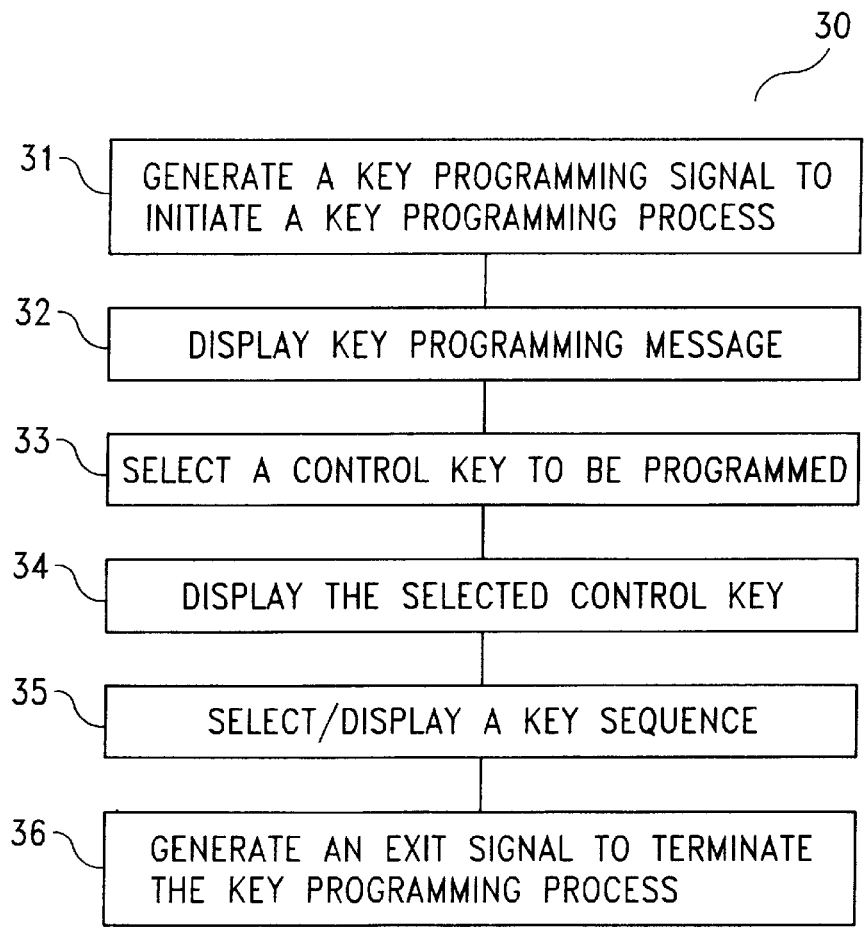
FIG. 3 is a flow chart which shows the key programming process according to the present invention.

FIG. 3 is a flow chart which shows a key programming process 30 according to the present invention. The key programming process 30 comprises the following steps:

(31) generating a key programming signal by pressing the program key 20 of the game control unit 11 to initiate the key programming process;

(32) displaying a key programming message at the video display 13;

(33) selecting a control key such as P1, P2 or P3, to be programmed;

(34) displaying a message at the video display 13 to show the selected control key;

(35) selecting and displaying a key sequence which is formed by a plurality of other control keys for defining the function of the selected control key; and

(36) generating an exit signal from the game control unit 11 to terminate the key programming process.

The exit signal can also be generated by pressing the program key 20 at the end of the process 30. The memory means 18 of the game control unit 11 is used to store the key sequence for the programmed control key wherein the game control unit 11 generates a plurality of input signals according to the key sequence stored in the memory means 18 after the programmed control key is pressed.

The memory means 18 can be eliminated to simplify the game control unit 11 if the input signals generated by the key sequence during the process 30 can be saved in the memory unit 22 of the game box 12 by the system software of the game box 12 instead of in the memory means 18. The system software can then pass the saved signals to the video game software when the programmed control key is pressed again. Such design totally eliminates the need for the memory means 18 to store key sequences for those programmed control keys.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A video game system comprising:
   (1) a video display for displaying a key programming process, and for displaying video output of the video game system;
   (2) a game cartridge having a video game software stored in the game cartridge;
   (3) a game control unit having a program key and a plurality of control keys, said game control unit having no processing unit for processing the program key and said plurality of control keys; and
   (4) a game box comprising:
      (a) an electrical cable for connecting the video display;
      (b) a slot for receiving the game cartridge wherein the game cartridge is removable when the game cartridge is plugged in the slot;
      (c) a memory unit and a central processing unit (CPU) for program execution;
      (d) a system software for controlling operations of the game box; the system software comprising a displaying software for controlling operations of displaying the key programming process over the video display after the program key is pressed and terminating display of the key programming process after the program key is pressed again; the key programming process defining a function of a control key by using a key sequence which is formed by a plurality of other control keys of the game control unit, said key sequence being stored in said game box;
   wherein the video game software stored in the game cartridge is executed by the CPU when playing the video game, and the game box receives input signals from the game control unit to control proceedings of the video game and displays video outputs over the video display.

2. The video game system of claim 1 wherein the game control unit further comprises a memory means for storing the key sequence wherein the game control unit generates a plurality of input signals according to the key sequence stored in the memory means after the programmed control key is pressed.

3. The video game system of claim 1 wherein the input signals generated by the key sequence during the key programming process are saved in the memory unit of the game box by the system software wherein the system software passes the saved signals to the video game software after the programmed control key is pressed.

4. The video game system of claim 1 wherein the game control unit is electrically connected to the game box through an electrical cable.

5. The video game system of claim 1 wherein the game control unit communicates with the game box by using a wireless communication method.

6. The video game system of claim 1 further comprising a storage unit for storing the system software.

7. The video game system of claim 1 wherein the system software is stored in the game cartridge.

8. The video game system of claim 1 wherein the game cartridge comprises a read-only-memory device for storing the video game software.

9. A key programming method for defining the function of a control key of a game control unit having a program key and a plurality of control keys for playing a video game stored in a game box, the game box receiving input signals from the game control unit, processing the video game and displaying video outputs over a video display, the video display also displays a key programming process, said game control unit having no processing unit for processing the program key and said plurality of control keys, the key programming method comprising the steps of:
   (1) generating a key programming signal by pressing the program key of the game control unit to initiate the key programming process;
   (2) displaying a key programming message at the video display;
   (3) selecting a control key being programmed, signals representative of the control key being then stored in the game box;
   (4) displaying a message at the video display to show the selected control key;
   (5) selecting and displaying a key sequence which is formed by a plurality of other control keys for defining function of the selected control key, signals representative of said other control keys being then stored in the game box; and
   (6) generating an exit signal from the game control unit to terminate the key programming process.

10. The key programming method of claim 9 wherein the game control unit further comprises a memory means for storing the key sequence wherein the game control unit generates a plurality of input signals according to the key sequence stored in the memory means after the programmed control key is pressed.

11. The key programming method of claim 9 wherein the input signals generated by the key sequence are saved in the memory unit of the game box wherein the game box passes the saved signals to the video game after the programmed control key is pressed.

12. The key programming method of claim 9 wherein the game control unit is electrically connected to the game box through an electrical cable.

13. The key programming method of claim 9 wherein the game control unit communicates with the game box by using a wireless communication method.

14. The key programming method of claim 9 wherein the exit signal is also generated by the pressing the program key.

* * * * *